US009203641B2

(12) United States Patent
Handforth et al.

(10) Patent No.: US 9,203,641 B2
(45) Date of Patent: Dec. 1, 2015

(54) METHOD AND APPARATUS FOR PROVIDING MOBILE INTER-MESH COMMUNICATION POINTS IN A MULTI-LEVEL WIRELESS MESH NETWORK

(75) Inventors: Martin Ridgway Handforth, Kanata (CA); Herman Kwong, Kanata (CA); Guy Duxbury, Nepean (CA); Aneta Wyrzykowska, Kanata (CA); Larry Marcanti, Allen, TX (US); Ryan M. Stark, Ottawa (CA)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 13/567,373

(22) Filed: Aug. 6, 2012

(65) Prior Publication Data

US 2012/0294182 A1 Nov. 22, 2012

Related U.S. Application Data

(63) Continuation of application No. 10/678,703, filed on Oct. 3, 2003, now Pat. No. 8,248,968.

(51) Int. Cl.
*H04L 12/26* (2006.01)
*H04L 12/44* (2006.01)

(52) U.S. Cl.
CPC ..................... *H04L 12/44* (2013.01)

(58) Field of Classification Search
USPC ......... 370/241, 252, 310, 311, 338, 400, 401, 370/406
See application file for complete search history.

(56) References Cited

U.S. PATENT DOCUMENTS

| 5,479,400 | A | 12/1995 | Dilworth et al. |
|---|---|---|---|
| 6,370,185 | B1 | 4/2002 | Schmutz et al. |
| 6,427,072 | B1 * | 7/2002 | Reichelt ..................... 455/404.1 |
| 6,996,086 | B2 | 2/2006 | Wolfe et al. |
| 7,161,926 | B2 | 1/2007 | Elson et al. |
| 7,164,667 | B2 | 1/2007 | Rayment et al. |
| 7,206,294 | B2 | 4/2007 | Garahi et al. |
| 7,382,771 | B2 | 6/2008 | Leblanc et al. |
| 7,453,858 | B2 | 11/2008 | Csapo et al. |

(Continued)

OTHER PUBLICATIONS

Tchoumatchenko, Konstantin; Baccelli, Francois. "Stochastic Geometry: A Tool for Modeling of Telecommunication Networks;" found at http://www.di.ens.fr/~mistral/sg/ (accessed on Nov. 13, 2012); created Dec. 1, 1998; pp. 1-8.

(Continued)

*Primary Examiner* — Yemane Mesfin
*Assistant Examiner* — Mon Cheri Davenport
(74) *Attorney, Agent, or Firm* — Myertons, Hood, Kivlin, Kowert & Goetzel, P.C.

(57) ABSTRACT

A mobile backhaul inter-mesh communication point forms an interface between a wireless mesh network on a first level and a wireless mesh network on a second, higher bandwidth, level. The two wireless networks are differentiated, e.g., by causing the mesh networks to be formed using different spectra, protocols or coding, or antennae. The mobile intra-mesh communication point functions as an access point in the lower level mesh network and as a relay point in the upper level mesh network. Utilizing mobile inter-mesh communication points facilitates deployment of wireless network access points while enabling the location of access points to follow the concentration of network users. Mobile inter-mesh communication points may be deployed in personal vehicles such as cars, trucks, and motorcycles, public transportation vehicles such as busses, trains, and aircraft, emergency vehicles such as fire trucks and ambulances, and many other types of vehicles.

19 Claims, 8 Drawing Sheets

(56) References Cited

U.S. PATENT DOCUMENTS

| | | |
|---|---|---|
| 2003/0032451 A1 | 2/2003 | Hu |
| 2005/0232179 A1 | 10/2005 | daCosta et al. |
| 2007/0004466 A1* | 1/2007 | Haartsen ................. 455/572 |

OTHER PUBLICATIONS

Park, Dave. "Beyond the Hot Spot: Wireless for Profit, The Benefits of a Multiple Point-to-Point Mesh Network;" BelAir Networks White Paper; 2003; pp. 1-10.

"Cellular Backhaul Using Wireless Mesh Topologies;" interWAVE Communications White Paper; 2002; pp. 1-10.

"Metro-Scale WiFi Using Tropos Networks' Cellular Mesh Technology;" Tropos Networks White Paper; Jan. 2004; pp. 1-8.

"Fixed Wireless Equipment;" 802.11a Backhaul, ISP-Planet; Aug. 19, 2003; pp. 1-3.

Wirbel, Loring; Mannion, Patrick. "IEEE 802.16 spec could disrupt wireless landscape;" CommsDesign; found at URL: http://www.commsdesign.com/showArticle.jhtml?articleID=12803737 (accessed on Nov. 13, 2012); Jan. 30, 2003; pp. 1-2.

* cited by examiner

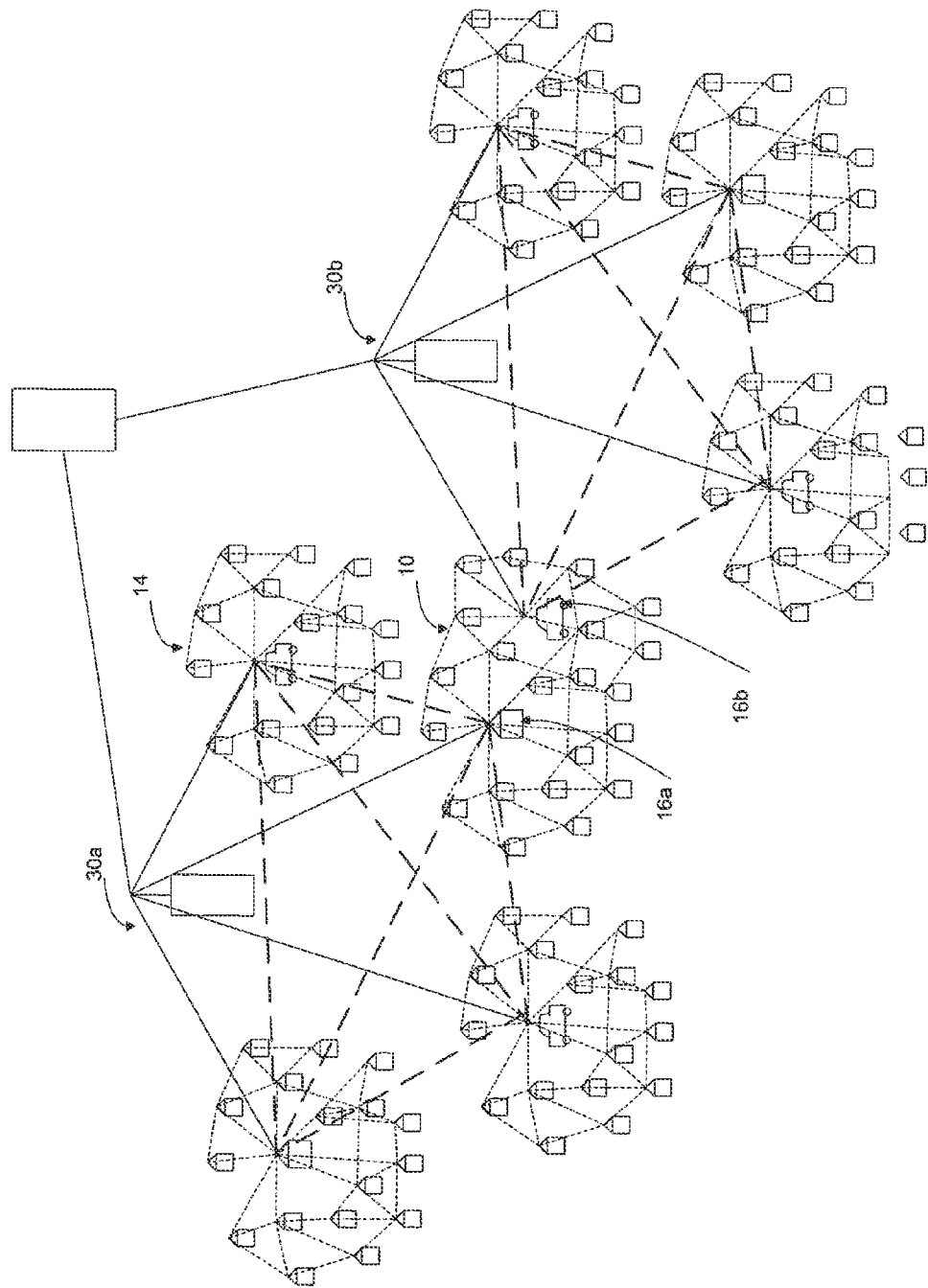

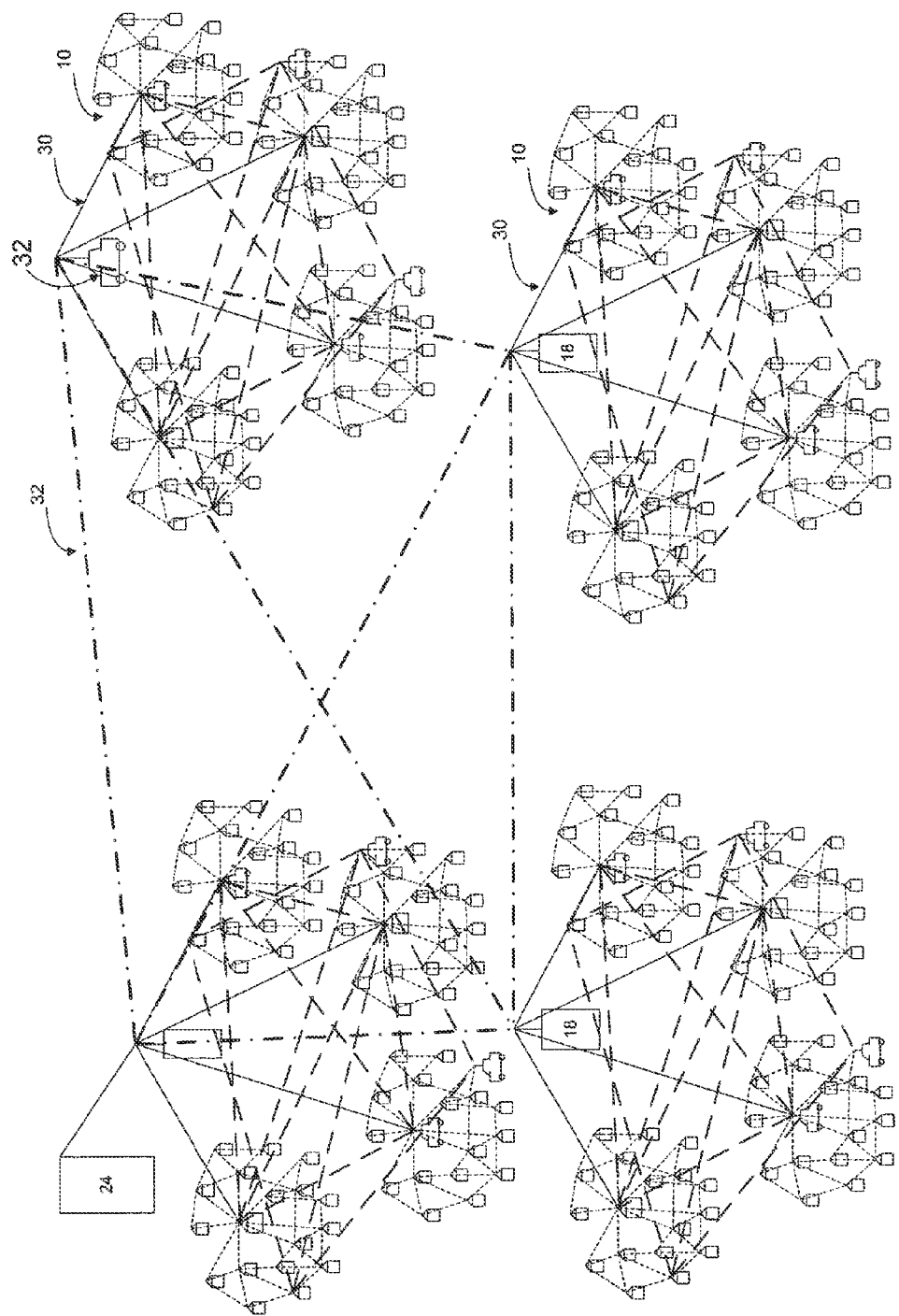

Figure 6

| MESH LEVEL | INTER-MESH CHANNELS | NETWORK | SUBSCRIBERS | ACCESS POINTS AREA | TIER DATA AGGREGATION | VOICE ONLY AGGREGATION | AIR INTERFACE BANDWIDTH |
|---|---|---|---|---|---|---|---|
| NETWORK FIXED ACCESS | | PSTN/ BACKHAUL | 10 MILLIONS | 1,000,000 m² | 500 Mbps PEAK TO MEAN UNITY | 5 Mbps | |
| | LEVEL THREE NETWORK FIXED ACCESS | | | | | | 802.16x 134.4 Mbps |
| MESH LEVEL THREE (AP MESHING) | | WMAN/ CELLULAR | 100 THOUSANDS TO 10 MILLIONS | 100,000 m² per AP | 500 Mbps | 5Mbps | 802.16x 134.4 Mbps |
| | LEVEL TWO - LEVEL THREE | | | | | | 802.16x/802.11x |
| MESH LEVEL TWO (AP MESHING) | | WCAN | THOUSANDS TO 10 THOUSANDS | 10,000 m² per AP | 300 Mbps | | 802.11a 54 Mbps |
| | LEVEL ONE - LEVEL TWO | | | | | | 802.11a 54 Mbps |
| MOBILE LEVEL ONE (MOBILE SUBSCRIBER MESHING) | | WLAN | TENS TO THOUSANDS | 1,000 m² per AP | 30 Mbps | | 802.11b 11 Mbps |

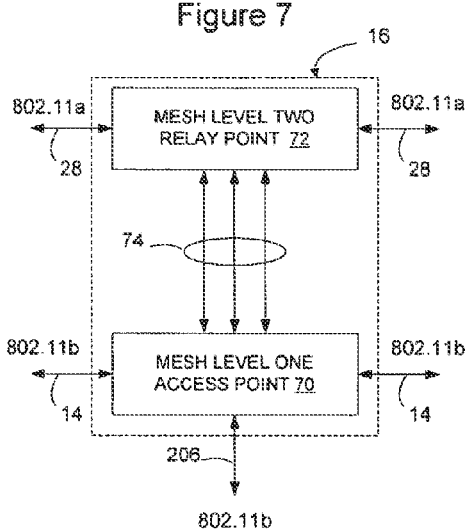
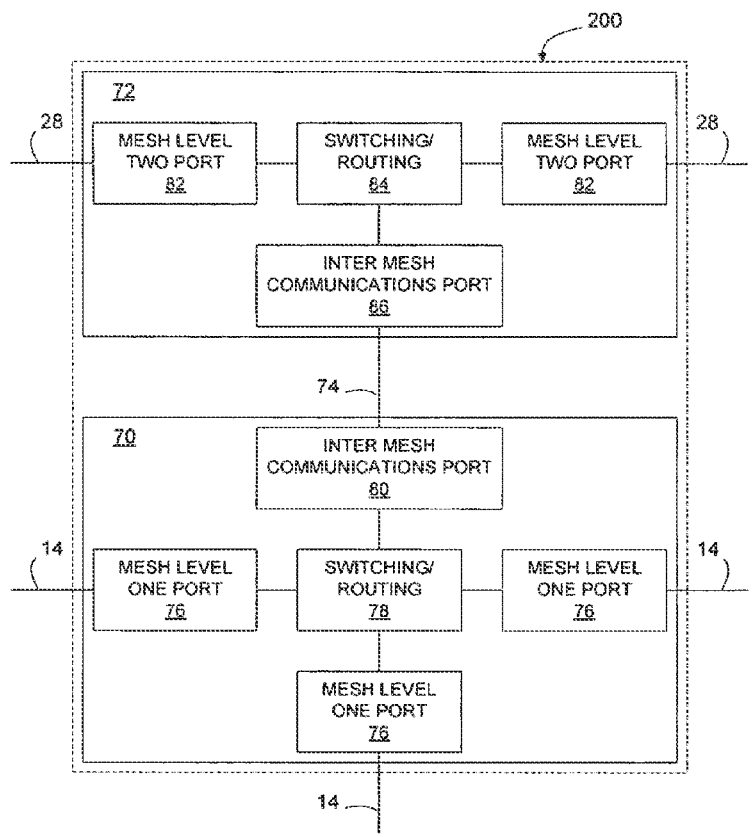

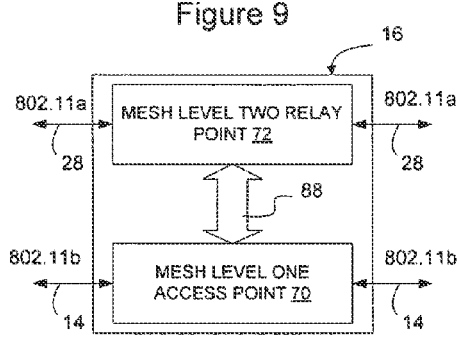
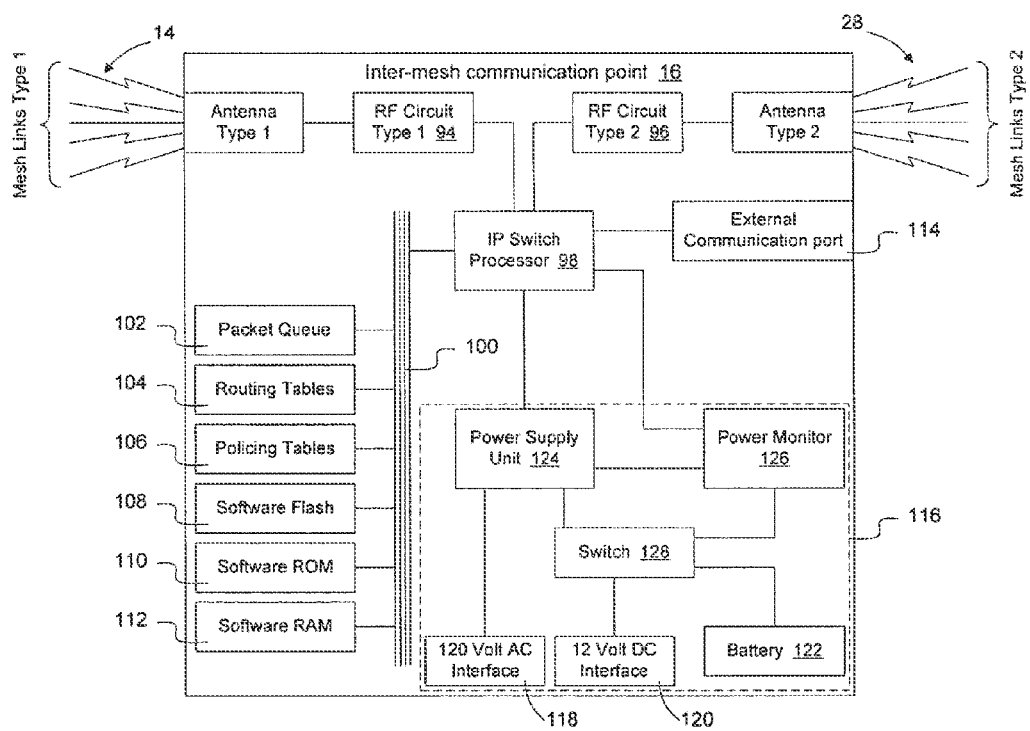

US 9,203,641 B2

METHOD AND APPARATUS FOR PROVIDING MOBILE INTER-MESH COMMUNICATION POINTS IN A MULTI-LEVEL WIRELESS MESH NETWORK

CROSS REFERENCE TO RELATED APPLICATIONS

This application is a continuation of U.S. patent application Ser. No. 10/678,703, titled "Method and Apparatus for Providing Mobile Inter-Mesh Communication Points in a Multi-Level Wireless Mesh Network" filed Oct. 3, 2003 now U.S. Pat. No. 8,248,968, whose inventors are Martin Ridgway Handforth, Herman Kwong, Guy Duxbury, Aneta Wyrzykowska, Larry Marcanti, and Ryan M. Stark, which is related to U.S. patent application Ser. No. 10/406,271, filed Apr. 4, 2003, entitled "System and Method for Multi-Level Wireless Access Mesh Networking," the content of which is hereby incorporated herein by reference.

BACKGROUND OF THE INVENTION

1. Field of the Invention

The invention relates to wireless networks and, more particularly, to a method and apparatus for providing mobile inter-mesh communication points in a multi-level wireless mesh network.

2. Description of the Related Art

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighbouring users.

One example of a mesh network is an 802.11b access mesh. If a set of users in close geographical proximity are equipped with 802.11b cards, they can communicate with other users in a series of hops until reaching an access point of the mesh network. Typically the access point is connected to a fixed network using a point-to-point link such as an optical fibre, copper loop, or via another wireless transmission. Due to latency and system complexity the number of wireless router hops is typically kept to some maximum, for example six. This limits the area of coverage of a wireless mesh network to a "cluster" or neighbourhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1. Another example of a wireless mesh network is given in US Patent application publication no. US 2002/0159409 A1, the content of which is hereby incorporated herein by reference. In the example illustrated in FIG. 1, a number of different mesh networks 10 are shown, each of which may be on the scale of a neighbourhood. Each mesh network 10 has a number of relay points 1 connected together and configured to handle traffic on the mesh. For example, each household in a neighbourhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 1, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Access points must be deployed and must be maintained after deployment. Installation of an access point requires the network operator to secure appropriate rights to the real estate where the access point is to be deployed, and requires the access point to be connected to a source of electrical power. Maintenance includes routine servicing, as well as servicing of the access point in the event of a failure. Larger numbers of access points increase both initial deployment costs and ongoing operation costs. These costs present potential impediments to proliferation of wireless mesh networks.

SUMMARY OF THE INVENTION

The present invention overcomes these and other drawbacks by providing a method and apparatus for reducing the number of backhaul links in a mesh network architecture by using two levels of mesh networking, and for powering inter-mesh communication points in a multi-level wireless mesh network, for example by deploying mobile backhaul inter-mesh communication points with higher bandwidth backhaul capabilities in vehicles. According to an embodiment of the invention, the mobile inter-mesh communication points operate as an access point in a first level wireless mesh network, and as a relay point in a second level wireless mesh network, to enable the two wireless mesh networks to be interconnected. The two wireless mesh networks, in this embodiment, are formed using different technologies so that they are distinct and can coexist in the same physical space. According to one embodiment of the invention, the mobile inter-mesh communication point participates as an access point in a lower level wireless mesh network to enable users in the lower level mesh network to access data outside of the lower level wireless mesh network. The mobile access point also participates as a relay point in a higher level wireless mesh network to enable requests for data to have multiple paths through the higher level wireless mesh network to a source of data or other higher bandwidth transmission capacity.

Providing multiple paths through the higher level mesh network allows fewer first tier backhaul links to be used to serve a given number of mesh networks, thus allowing for higher utilization rates on the first tier backhaul links without causing the call blocking ratio on the secondary backhaul links to become onerous. The reduced number of backhaul links reduces the operating and installation expenses associated with deploying equipment to service the first tier backhaul links. Additionally, by making the inter-mesh communication points mobile, the inter-mesh communication points are able to follow the transitory migration patterns of the network users, to allow the inter-mesh communication, points to move to where data traffic densities are the highest. This allows extra band-width to be enabled to cover emergency situations and large venues, as well to solve ad-hoc network requirements. Enabling the inter-mesh communication points to be deployed in vehicles also provides a ready source of power to the inter-mesh communication points, as vehicles commonly are equipped with an electrical system, battery, or other source of power.

The mesh networks may be selected such that the upper layer mesh network has a higher backhaul capacity, and may be formed by multiple technologies that enable the meshes of the different levels to be differentiated. For example, the meshes may be differentiated by causing the meshes to operate in different portions of the spectrum (e.g. at 2.40 GHz and 5.0 GHz, or in any other convenient area(s) of the spectrum), by utilizing different protocols or coding schemes in the different meshes (e.g., utilizing different 802.11x standards or an 802.11x standard and one of the 802.16x standards) or by using different antennae designed to perform differently in the two meshes (e.g., using antennae with different heights or directional antennae). The mobile inter-mesh communication point may be one device configured to operate on both meshes, or may be formed of several devices, each configured to operate on one of the meshes, and which are configured to communicate with each other. Where several devices are used, a signal path between the two devices may be formed, e.g., using a non-mesh wireless link or a non-wireless link.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labelled in every figure. In the figures:

FIG. 4 is a functional block diagram of a two-level wireless mesh network in which a given first level mesh cluster has access points on two second level mesh networks;

FIG. 5 is a functional block diagram of a three-level wireless meshed network according to an embodiment of the invention;

FIG. 6 is a table providing an example mapping of air interface technologies to mesh levels;

FIGS. 7-10 are a functional block diagrams of inter-mesh wireless access points according embodiments of the invention;

DETAILED DESCRIPTION

Figure 1:
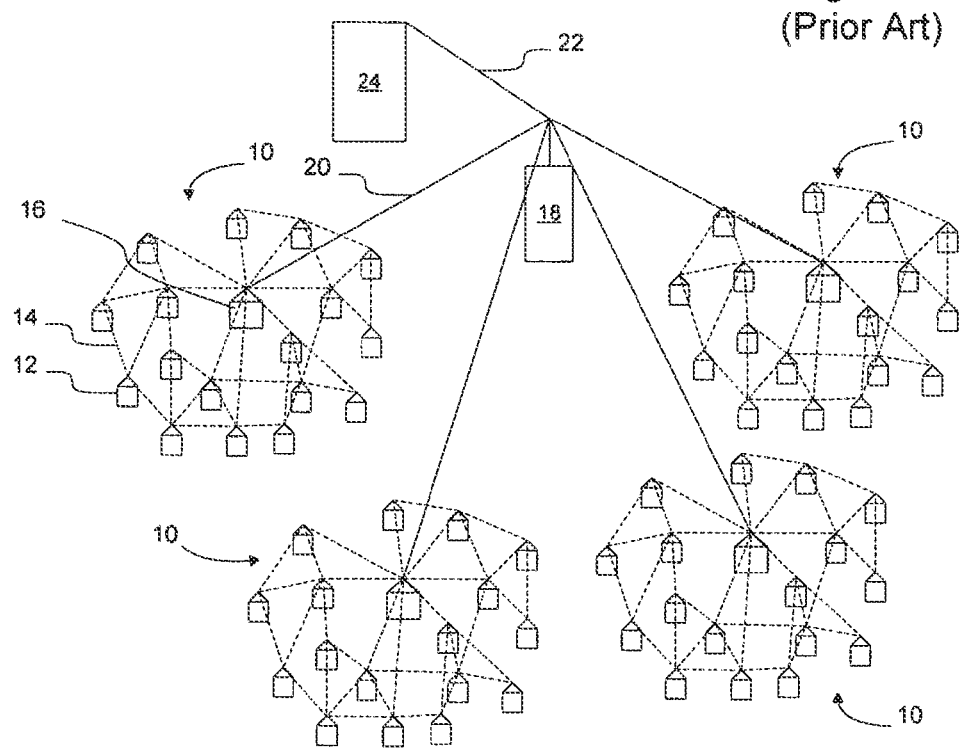
FIG. 1 is a functional block diagram of an example of a conventional one level wireless mesh network.

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, according to an embodiment of the invention, mobile inter-mesh communication points in a multi-level mesh network are utilized to enable network elements on a first level mesh network to obtain access to higher bandwidth resources available on a second level mesh network using fewer backhaul fixed access points with lower blocking ratios. According to an embodiment of the invention, the mobile inter-mesh communication points operate as an access point in a first level wireless mesh network, and as a relay point in a second level wireless mesh network, to enable the two wireless mesh networks to be interconnected. The two wireless mesh networks, in this embodiment, are formed using different technologies so that they are distinct and can coexist in the same physical space. According to one embodiment of the invention, the mobile inter-mesh communication point participates as an access point in a lower level wireless mesh network to enable users in the lower level mesh network to access data outside of the lower level wireless mesh network. The mobile access point also participates as a relay point in a higher level wireless mesh network to enable requests for data to have multiple paths through the higher level wireless mesh network to a source of data or other higher bandwidth transmission capacity.

The mobile inter-mesh communication points may be located in vehicles, such as cars, trucks, buses, fire trucks, ambulances, helicopters, airplanes, trains, boats, personal mobility craft such as electric wheelchairs and devices known as the Segways™, golf carts, motorcycles, mopeds, all terrain vehicles (ATVs), campers, and many other types of vehicles. Utilizing mobile wireless inter-mesh communication points is advantageous for many reasons. For example, vehicles generally have a self contained source of power which may be utilized to power the inter-mesh communication point. Additionally, usage on the network tends to flow to where the majority of the network users are located. For example, in a commuting environment, usage on a network tends to be higher in a city during the daytime (when a larger number of users are in the city to work) and tends to be higher in the suburbs during the evenings and on weekends (when a larger number of users have returned home). Incorporating inter-mesh communication points in vehicles used by commuters allows the concentration of inter-mesh communication points to follow the migratory demand concentration placed on the network by network users.

Power can be provided to the inter-mesh relay point by connecting the inter-mesh communication point to the vehicle's power supply, e.g. battery and electrical system, or by providing a separate battery or fuel cell to power the inter-mesh communication point. Where a separate battery is provided, the inter-mesh communication point may still be connected to the vehicles electrical system to enable recharging of the inter-mesh communication point's battery. Providing a separate battery enables the inter-mesh communication point to operate when the vehicle is not in use without depleting the charge in the vehicle's battery, which will be required to start the vehicle the next time the vehicle is to be used. Providing a separate battery, however, requires additional battery maintenance, and hence cost, as batteries occasionally need to be maintained or replaced as they gradually lose their ability to hold a charge. A fuel cell may be utilized as well to provide power to the inter-mesh communication point.

Depending upon the implementation selected, various problems inherent in wireless networks may be solved. For example, deployment restrictions due to radio channel components can be alleviated by having more than one route via other nodes that allow the radio channel components to have less affect on the received signal at each node in the signal paths to the node. In a wireless network, the radio channel is typically modeled by the product of three independent components: fading, shadowing, and path loss. Fading describes the multipath effect of the channel and shows the variations of received signal over distances on the order of a wavelength. Shadowing models the slow variation on the mean envelope of the received signal over a distance corresponding to several tens of wavelengths and is well predicted by a lognormal distribution. Path loss predicts how the mean signal power decays with distance from the transmitter. For example, a link between an originating node and an end node, might need to circumvent a large building located physically between the originator and receiver nodes. In a wireless mesh network, a wireless router located to the side of the building can route the link around the building. In general, multipath effects can be avoided when the signal power is high enough to prevent the signal power variations from dropping below the receiver threshold. Well known antenna strategies, such as using multiple antennas, can reduce the affects of fading.

Using two meshes at two levels enables the overall capacity of the network to be enhanced by allowing traffic on the second level to be distributed more evenly between multiple fixed and mobile network access nodes so that the peak-to-mean traffic ratio on the second level backhaul link may be made to approach unity. Thus, smaller fixed links may be utilized more fully to interconnect the second level mesh network to backbone resources to achieve greater capacity.

Utilizing mobile wireless access points in the first level mesh network enables the initial cost to be reduced, as the cost associated with installation may be reduced by causing the inter-mesh connectivity points to be installed in the vehicles by the vehicle owner or vehicle manufacturer. Additionally, cost associated with deployment and ongoing operations may be reduced by allowing the network owner to cancel existing leasehold agreements and liquidate real estate assets to take advantage of the reduced need for access to real property.

Additionally, by migrating multiple inter-mesh communication points to a single location, there is the potential to dynamically activate and deactivate cells as traffic density patterns vary across the city, allocating the digital processing power only to those areas where bandwidth is required. To maintain full coverage in low traffic areas, the power levels on the remaining activated cells may be set to increased levels to increase the range of the inter-mesh communication point. This architecture also inherently gives service redundancy allowing for the replacement of failed units.

Figure 2:
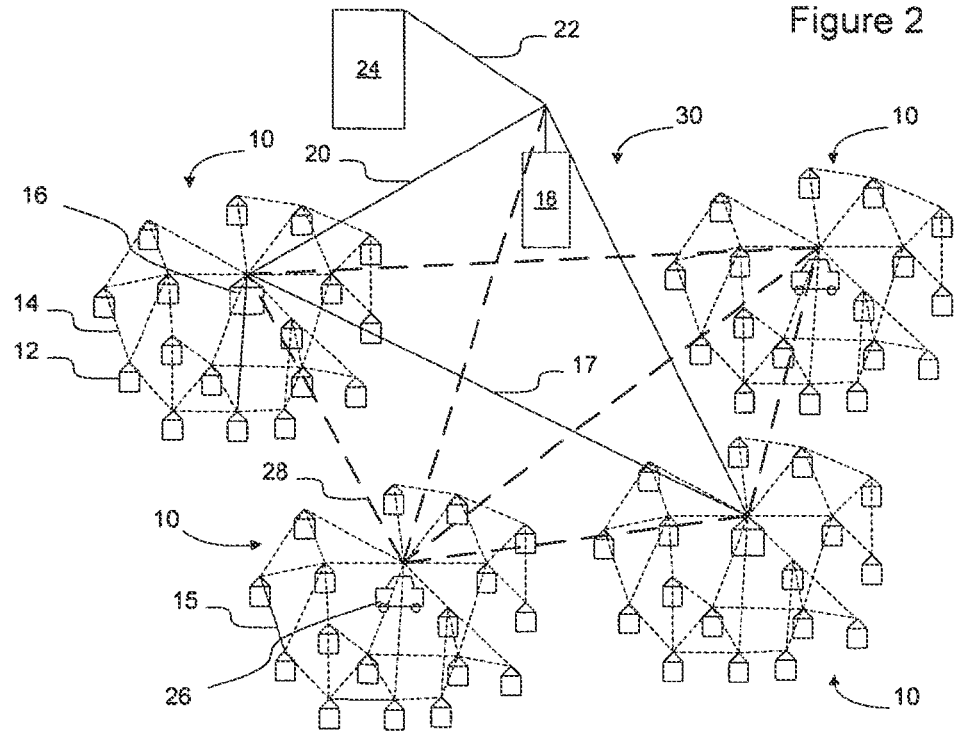
FIGS. 2 and 3 are functional block diagrams of two-level wireless meshed networks including mobile inter-mesh communication points according to embodiments of the invention.

One embodiment of an example of a two-level wireless mesh network utilizing mobile inter-mesh communication points according to an embodiment of the invention is illustrated in FIG. 2. In the embodiment illustrated in FIG. 2, a plurality of mesh networks 10 are provided, each of which includes a plurality of relay points 12 interconnected by wireless links 14. The level one mesh network 10 may include any subsidiary devices connected as part of the mesh using the same access space. Relay points 12 in the first level wireless mesh network may be fixed or mobile. In the mobile embodiment, the level one mesh network will be evolving over time as users move, and as users move from one level one wireless mesh network to another level one wireless mesh network.

An access point 16 in each wireless mesh network 10 functions as an aggregation point on the wireless mesh network 10 and interconnects the wireless mesh network 10 to a higher bandwidth communication resource, such as a Wide Area Network (WAN) base station 18. As shown in FIG. 2, one or more of the access points 16 may be deployed in a mobile vehicle 26 (such as the mobile vehicle illustrated in FIG. 12 and discussed in greater detail below).

A second set of links 28 are configured to interconnect the access points 16. Although in the embodiment illustrated in FIG. 2 all access points 16 are interconnected via second level wireless mesh links 28, the embodiment is not limited in this regard as select first level access points 16 may participate in the first level mesh only and connect via first level backhaul links 20 to the WAN base station 18.

The second set of links 28 are configured to implement a second level mesh network. In this manner, the first level access points 16 are able to participate in the second level wireless mesh network as relay points and/or second level access points. A network element that is configured to participate in the first level mesh network as a first level access point, and configured to participate in the second level mesh network as a second level relay point or second level access point will be referred to herein as an inter-mesh communication point. Inter-mesh communication points may be fixed or mobile as illustrated in FIG. 2. Additionally, the inter-mesh communication points may be connected to the WAN base station 18 or may rely on other inter-mesh communication points to direct traffic to the WAN base station 18. Optionally, the WAN base station may participate in the second level wireless mesh network as an access point on the second level wireless mesh network.

As shown in FIG. 2, the WAN base station 18 may be connected via second tier wired or wireless backhaul link(s) 22 to further networking equipment, such as a central office 24. Alternatively, as shown in FIG. 5 (discussed below), the WAN base station 18 may be interconnected via a third level mesh network to other WAN base stations 18, at least one of which may be connected to another higher bandwidth communication resource. The invention is not limited to implementing two or three levels of mesh network, but rather extends to implementing any number of mesh networks greater than two. The inclusion of the second level mesh network provides multiple routes from each access point that may be utilized to transfer packets between the level one mesh networks and the central office. While the following description will focus on an implementation of the mesh networks involving wireless links, the invention does not exclude the additional inclusion of wired links, such as wired link 15 in the level one mesh network (see FIG. 2), wired link 17 in the level two mesh network (see FIG. 2), or the inclusion of a wired link at any other mesh networking layer. Additionally, line-of-site optical transmission links may be utilized as well and the invention is not limited to an embodiment excluding any particular type of communication links.

In the embodiment of FIG. 2, the links 28 in the second level wireless Mesh network 30 are distinct from the links 14 which make up the level one wireless mesh networks. In the illustrated embodiment, the same inter-mesh communication points 16 participate in both the level one wireless mesh network and the level two wireless mesh network. However, it is possible that the level one wireless mesh network and the level two wireless mesh network are separated by further non-mesh or non-wireless links. In this case, there would be different physical devices which participate in the two mesh network levels. Implementations of examples of inter-mesh communication points embodied either as a single physical device or as multiple physical devices, are described in greater detail below in connection with FIGS. 7-11.

The links 14, 28 used to form the first and second level mesh networks need to be physically distinct. This distinction can occur via spectrum usage, protocol, coding, or antenna coverage/configuration to name a few examples. It is also noted that two levels of meshing are hierarchically distinct. That is, two level one meshes interconnected to each other through a central office do not constitute level one and level two meshes.

The two levels of mesh networking may be distinguished by frequency or protocol. For example, in one implementation, the level one mesh networks 10 may be configured to operate utilizing the Institute of Electrical and Electronics Engineers (IEEE) 802.11b wireless communication protocol (or one of the other 802.11x protocols), and the relay points and access points in the level one wireless mesh networks are configured to communicate with each other utilizing this protocol. The 802.11b protocol currently enables communications to take place at 11 Mega bits per second (Mbps) at a frequency of 2.4 GigaHertz (GHz). The second level mesh network, in this implementation, may be configured to operate utilizing one of the IBEE 802.16x protocols, the Universal Mobile Telecommunication System (UMTS) wireless communications protocol, the IEEE 802.11a wireless communication protocol, or other emerging protocols such as IEEE 802.18, and relay points and access points in this level two wireless mesh network are configured to communicate with each other utilizing this protocol. The 802.11a protocol currently enables communications to take place at 54 Mbps at a frequency of 5 GHz. Other protocols transmitting at other frequencies may be utilized as well and the invention is not limited to this particular example. For example, one or more of the mesh levels could also be configured to support the IEEE 802.11g standard, which supports both 802.11a and 802.11b, HiperLAN or Bluetooth.

There are several different antenna technologies that may be used to separate transmission of signals or improve special spectral efficiencies and robustness or other characteristics in the first and second level mesh networks. For example, in one embodiment, omni-directional antennas may be used in the level one mesh network and a beamed antenna may be used in the level two mesh network. Other embodiments exist and the invention is not limited to this particular example. Generally, there are two types of antennas: adaptive and non-adaptive. Non-adaptive antennas generally generate omni-directional patterns and x-sector patterns. Adaptive antennas generally use omni-directional transmissions during an initial set-up mode and then utilize beam-formation and beam-steering to form a directional transmission pattern. Adaptive antennas, due to the directional nature of the transmission patterns, generally are considered to have increased signal strength over non-directional antennas. Several well known types of antennas, such as Multiple In Multiple Out (MIMO) antennas and X-sector antennas may be advantageously used in connection with embodiments of the invention. X-sector antennas are well known and are deployed widely in conventional wireless cellular base stations. MIMO antennas provide enhanced performance, such as call blocking, time to drop a link, down time, and other enhanced features that may not be available in other types of antennas. Different heights of antennas could also be used for the two meshes to differentiate transmissions on the two levels of mesh networking.

In a mobile environment, when the inter-mesh communication point is moving, it may be advantageous to utilize omni-directional antennas in the level one mesh to enable the mobile inter-mesh communication point to receive and transmit signals to the level one mesh participants without requiring the inter-mesh communication point to track the direction and/or location of the level one mesh participants and form a beam for each such participant. Similarly, in the second level mesh network, an omni-directional antenna may be utilized to transmit data on the second level mesh network. However, given the relatively smaller number of adjacent participants on the second level mesh network, it may be possible to utilize one or several directional antennas to direct communications toward other relay points and access points in the second level mesh network. A gyroscope, compass, GPS data, anticipated position based on upcoming perceived direction changes, or other information may be utilized to direct the directionality of transmission while the mobile inter-mesh communication point is moving.

When the mobile inter-mesh communication point has stopped moving, such as where the mobile vehicle is stopped in traffic, at a red light, or parked, it is easier to utilize directional antennas due to the fact that the participants in the level one and level two mesh networks are stationary.

Where access to an inter-mesh communication point is no longer available, for example where the inter-mesh communication point deactivates itself due to a loss of power (drained battery) or the inter-mesh communication point moves out of range from the mesh network users, it is necessary to select another inter-mesh communication point to service the wireless mesh. Hand-offs between inter-mesh communication points may take place in any conventional manner.

Where more than one potential inter-mesh communication point is available in a given area of the level one mesh network, the selection of one of the inter-mesh communication points to service particular network users may be made in many different ways. Selection may take into account the signal strengths received from the contending inter-mesh communication points, the amount of power available to the inter-mesh communication points, the location of the inter-mesh communication points, whether the inter-mesh communication points are stationary or moving, and if moving, the speed and direction of travel. Optionally, if there is history information known about a particular inter-mesh communication point, such as a routine daily commuting pattern, the history information may be utilized as well. In particular instances it may be desirable to prefer a stationary inter-mesh communication point, such as where a majority of users on the wireless mesh network to be served by the inter-mesh communication point are also stationary. Where a stationary inter-mesh communication point is not available, it may be desirable to select an inter-mesh communication point with a relatively slow velocity to maximize the amount of time users in the mesh may be able to communicate with the particular inter-mesh communication point. In other instances, it may be desirable to prefer an inter-mesh communication point that is traveling in a particular direction, such as where a sufficiently large number of users on a mesh network to be served by the inter-mesh communication point are also traveling in the same direction. This may occur, for example, where a number of commuters are traveling together along a highway during a rush-hour commute. Numerous implementations of routing, selection, and self-discovery algorithms may be utilized in connection with implementations of the invention, and the invention is not limited to any particular routing, selection, or self-discovery method.

In addition to selection of an appropriate inter-mesh communication point, it may also be advisable to enable the network operator to control which network elements are allowed to operate as inter-mesh communication points. The second level mesh network is typically a high bandwidth network and the network operator providing the second level mesh network services may desire to have control over which devices are allowed to transmit on the high bandwidth communication resource. Accordingly, in one embodiment of the invention, a registration process is instantiated when an inter-mesh communication point seeks to participate on the second level or higher level mesh networks. This registration may require the inter-mesh communication point to be authenticated on the network, such as by transmitting information stored in ROM on the network element. The invention is not limited to this particular manner of authenticating the inter-mesh communication point or to any particular manner of transmitting identification, authentication, or authorization information between the inter-mesh communication point and the higher bandwidth networks.

Enabling upper level access control at the network level allows the network operator to enable greater numbers of inter-mesh communication points in concentrated venues, such as in connection with a sporting event or in an emergency situation, where enhanced network traffic volumes are sensed. Additionally, access control may at the upper layer mesh network level may enable the network operator to reduce the amount of traffic to allow priority traffic, such as generated by a fire truck or other emergency vehicle in an emergency situation, to obtain priority access to the upper level mesh network. Likewise, where enhanced bandwidth is desired to be deployed, such as to meet the ad-hoc requirements of the network, additional inter-mesh communication points may be activated. Access control may be beneficial for many reasons and the invention is not limited to implementing these or any other specific set of functions.

According to one embodiment of the invention, routing at the lower level is handled by the users operating at that level and is not specified by the network operator. For example, a least minimum hops routing algorithm may be used to direct traffic through the level one mesh network, although the invention is not limited to this embodiment. In this embodiment, a network user initially finds a path through the mesh network to another user, or to the inter-mesh communication point. When that path dies or is no longer available for some reason, the network user finds a second path through the network. Optionally, the network user may select two or more paths for added security to enable one path to be used as a backup path in the event there is a problem with a primary path.

In one embodiment, access to the first level mesh is not restricted and participants on the first mesh are free to exchange data within the first mesh in an unrestricted fashion. Access to the second level mesh network, however, may be determined by the network provider to be conditioned on the user having established an account or otherwise paid to obtain access to the higher level mesh networking resources. Accordingly, filtering, policing, and other network control functions may be implemented by the inter-mesh communication points or by the WAN base station 18. For example, the inter-mesh communication point may be instructed by the WAN base station 18 that it is not to transmit any traffic originating from a network user with a particular MAC address. The invention is not limited to this embodiment, as other network elements may participate in applying network policy as well.

Vehicle owners may be given incentives to install an inter-mesh communication point in any number of ways. For example, the owner of the network may offer vehicle owners free or reduced price access to the higher bandwidth network resources, or may credit their account, or pay them based on the amount of traffic handled by their inter-mesh communication point. Additionally, because the network operator will have location information associated with the inter-mesh communication point, the network operator may be able to offer anti-theft security services to the vehicle owner. The invention is not limited to any particular strategy to induce vehicle manufacturers or vehicle owners to incorporate inter-mesh communication points in their vehicles.

Figure 3:
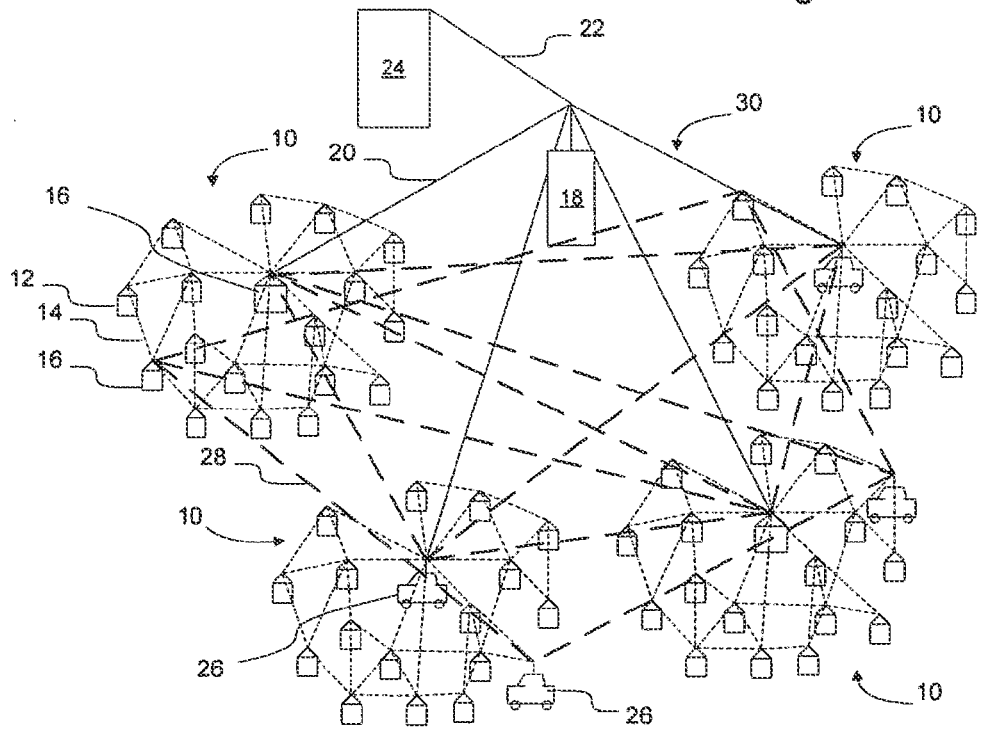

In the embodiment illustrated in FIG. 2, each level one mesh network is illustrated as having a single access point. The invention is not limited to this embodiment, however, as more than one access point may be included in a given level one mesh network. One example of an embodiment of the invention in which multiple access points are deployed in each mesh network is illustrated in FIG. 3. As shown in FIG. 3, the level one wireless mesh networks 10 may include one, two, three, or multiple access points, one or more of which is configured as an inter-mesh communication point so that it can participate on both the first level mesh network and the second level mesh network. The access points may be fixed or mobile and deployed in vehicles. One or more of the access points may be connected via backhaul links 20 to the WAN base station 18. The invention is not limited to any particular network topography and is not to be construed as limited to the topography illustrated in FIG. 3.

The example of FIG. 3 includes a backhaul link for each access point. More generally, it is only necessary to have one or more backhaul links connecting the level two wireless mesh network to the remainder of the network assuming of course there is a remainder of the network to connect to. If not, then no backhaul connections are needed. It is also possible there might be level one meshes which have either only a backhaul connection, or a single level two wireless link to another access point. Such mesh networks would not really benefit from the multi-level mesh networking provided by the invention. However, the invention does not require that absolutely every level one mesh network be connected to the level two mesh network.

FIG. 4 illustrates an embodiment of a two level wireless mesh network topography in which access points within one first level wireless mesh network are configured to communicate with two separate level two wireless mesh networks. Specifically, as shown in FIG. 4, a level one wireless mesh network 10a includes a first access point 16a configured to operate as an inter-mesh communication point on a first level two wireless mesh network 30a, and a second access point 16b configured to operate as an inter-mesh communication point to connect the first level mesh network to a second level two wireless mesh network 30b.

FIG. 5 illustrates an embodiment of the invention in which a third level mesh networks 32 is configured to interconnect multiple second level mesh networks 30. If desired, a first level mesh network 10 may be connected directly to the third level mesh network as well, although that has not been illustrated in this embodiment. As shown in FIG. 5, the third level mesh network 32 interconnects WAN base stations 18 providing multiple paths from the WAN base stations 18 to the central office 24. The connections between the second level mesh network and third level mesh network may be fixed or mobile, as illustrated by mobile inter-mesh communication point 34. In this embodiment, the links forming the third level mesh network 32 should be physically distinct from the links used on the first two levels to enable the third level wireless mesh network to be distinguished from the other wireless mesh networking levels. The invention is not limited to an implementation utilizing only three levels of wireless mesh networking as other additional levels may be utilized as well.

FIG. 6 is a chart illustrating one example of how a multi-level mesh might be deployed, and showing how aggregation takes place. There is a row in the table for each mesh level, and for each inter-mesh channel, this being the channel providing communications from one mesh level to another mesh level. For the three mesh level example, there is therefore a row 40 for mesh level one, a row 42 for the inter-mesh channel connecting mesh level one to mesh level two, a row 44 for mesh level two, a row 46 for the inter-mesh channel connecting mesh level two to mesh level three, a row 48 for mesh level three, a row 50 for inter-mesh channels connecting mesh level three to the network fixed access, and a row 52 for the network fixed access.

Columns 54 and 56 respectively indicate which mesh level or inter-mesh channel a given row pertains to. In one implementation, mesh level one pertains to mobile subscriber meshing, and this is often referred to as a Wireless Local Area Network (WLAN). The mesh level two in this case can be considered to be an example of a Wireless Community Access Network (WCAN). Mesh level three can be considered to be an example of a Wireless Metropolitan Area Network (WMAN). Finally, the network fixed access can be considered to be the PSTN/backhaul. These commonly used networking terms appear in column 58 for each mesh level. Column 60 includes an example of how many subscribers might be involved with each mesh level. Column 62 gives an example of a geographical area that each mesh level might relate to. Column 64 indicates an example of a peak bandwidth requirement for each channel. Thus, for level one meshing, there is shown to be a peak bandwidth possibility of 30 Mbps. However, it is well known that very few subscribers will operate at the peak at a given instant and that the average is actually much lower, and approaching approximately 30 Kbps. Thus, for the mesh level one there is a very high peak-to-mean ratio. In a perfect implementation, by the time the PSTN/backhaul links are reached, the peak-to-mean ratio is very close to unity. Column 66 indicates bandwidth per voice only aggregation. Column 68 gives an example of the equivalent air interface bandwidth required for this example.

FIG. 7 illustrates one example of an inter-mesh communication point 16 having a level one mesh network access point 70 connected to a level two mesh network relay point 72. The level one mesh network access point 70 in this embodiment, is a network element, such as a router or a switch, having a number of ports serving wireless links 14 configured to communicate with other network elements participating on the level one mesh network. In the embodiment illustrated in FIG. 7 the wireless links are configured to be implemented utilizing the 802.11b protocol, but the invention is not limited to this embodiment. The level two mesh network relay point 72, in this embodiment, is also a network element such as a router or switch, having a number of ports serving wireless links 28 configured to communicate with other network elements participating in the level two mesh network. In the embodiment illustrated in FIG. 7, the wireless links 28 are configured to be implemented utilizing the 802.11a protocol, but the invention is not limited to this embodiment.

While the embodiment illustrated in FIG. 7 has been described as having the mesh networks differentiated by using two different transmission protocols, the invention is not limited to this embodiment, but rather extends to any manner of distinguishing the two mesh networks as described in greater detail above.

In the embodiment illustrated in FIG. 7, the mesh level one access point 70 and the mesh level two relay point 72 that collectively comprise the inter-mesh communication point 16 are configured to be two separate devices interconnected via a communications link 74. The invention is not limited to an inter-mesh communication point implemented as two separate devices as described in greater detail below in connection with FIGS. 9-11.

FIG. 8 illustrates the inter-mesh communication point of FIG. 7 in greater detail. Specifically, as shown in FIG. 8, the mesh level one access point 70 includes several mesh level one ports 76 interfacing mesh level one network links 14, and switching/routing circuitry 78 configured to switch/route communications passing through the mesh level one access point 70. Where communication on the level one mesh network 10 takes place using 802.11b, which is a level 2 communication protocol, the switching/routing circuitry may perform MAC address switching on packets to route packets between ports 76 or, where addressed to an entity outside the mesh level one network, to the upper level mesh network via an inter-mesh communications port 80 configured to interface communications link 74. Where a level 3 protocol is in use, such as Internet Protocol (IP), the switching/routing circuitry may route IP packets using the routing protocol instantiated in the domain comprising the level one wireless mesh network. The invention is not limited to any particular routing/switching protocols in use by the level one access point 70.

The mesh level two relay point 72 includes several level two ports 82 configured to interface mesh level two network links 28, and switching/routing circuitry 84 configured to route/switch communications passing through the mesh level two relay point 72. The mesh level two relay point 72 also includes an inter-mesh communications port 86 to interface with communication link 74 to thereby interconnect the level two relay point 72 with the level one access point 70. The switching/routing circuitry 84 may be configured to perform switching and/or routing decisions to transmit data between the mesh level two ports 82 and between the mesh level two ports 82 and the inter-mesh communications port 86. Switching/routing decisions may utilize the information attendant to packets transmitted in accordance with any conventional routing protocol.

FIGS. 9-10 illustrate embodiments of the invention in which the inter-mesh communications point 16 is formed as a single network element incorporating both mesh level one access point circuitry 70 and mesh level two relay point circuitry 72. In the embodiment of FIG. 9, a bus 88 interconnects the mesh level one access point circuitry 70 and mesh level two relay point circuitry 74. The mesh level one access point circuitry and the mesh level two relay point circuitry are the same as discussed above in connection with FIG. 7.

FIG. 10 illustrates an inter-mesh communication point 16 according to one embodiment of the invention. As shown in FIG. 10, the inter-mesh communication point 16 in this embodiment includes one or more antennas of type 1 (90) configured to send and receive signals (voice or data) over mesh links 14 of type 1. The inter-mesh communication point 16 also includes one or more antennas of type 2 (92) configured to send and receive signals (voice or data) over mesh links 28 of type 2. Although the embodiment illustrated in FIG. 10 includes a single antenna for each type of link, the invention is not limited to this embodiment, as a single antenna may be used to transmit signals on both types of links. Similarly, multiple antennas may be used to transmit signals on each type of link. Where three or more types of links are to be accessed by the inter-mesh communication point, additional antennas may be added as necessary.

The antennas are interfaced by RF circuitry. Specifically, in the embodiment illustrated in FIG. 10, the antenna of type 1 is interfaced by RF circuitry of type 1 (94), and the antenna of type 2 is interfaced by RF circuitry of type 2 (96). Analog/digital signals received over the antennas 90, 92 are processed by the RF circuitry 94, 96 and passed to a switch processor 98. The switch processor may be an internet protocol (IP) switch processor or a switch processor configured to implement another protocol. Although FIG. 10 illustrates an embodiment utilizing an IP switch processor, the invention is not limited to an intermesh communication point having a switch processor configured to process IP protocol data units.

The switch processor is connected to an expansion bus 100, such as a Peripheral Control Interconnect (PCI) bus, although the invention is not limited to the use of a particular type of expansion bus. The expansion bus 100 connects the IP switch processor 98 with various resources, such as storage resources that may be configured to store information temporarily or permanently on the inter-mesh communication point 16.

For example, in the illustrated embodiment, one slot on the expansion bus is connected to a packet queue 102 that is configured to store packets while the IP switch processor processes the packet. The packet queue 102, in this embodiment, may be any standard packet queue or packet storage facility. Optionally, the packets may be passed directly to the packet queue from the RF circuitry using direct memory access facilities (not shown) to reduce congestion on the expansion bus 100.

Another slot on the expansion bus may be connected to a storage area containing routing tables 104. The IP switch processor will typically access the routing tables when ascertaining how to handle a received protocol data unit. The routing tables, in this embodiment, may be used to keep track of which IP addresses are reachable through the inter-mesh communication point on the type 1 and type 2 mesh links, and over which port a packet should be directed to send the packet to the intended recipient. While the routing table in this embodiment has been described as a table of IP addresses, the routing table may also or alternatively maintain a table of other information, such as MAC addresses, and the invention is not limited to the use of a specific type of routing information in the routing tables. Optionally, the routing table may take the form of a standard routing information base.

Another slot on the expansion bus may be occupied by a memory module containing policing tables 106, for example configured to store filter rules for implementation on the inter-mesh communication point. As discussed above, the network operator may desire to filter traffic from the lower level mesh network to prevent a portion of that traffic aim being transmitted on the upper level mesh network. Several reasons for doing this may be to block access to a network user that has not established an account with the network operator, to block access to a network user that has an outstanding balance with the network operator, or to block access to a network user who has abused the network access privileges in some way, for example by sending an excessive amount of traffic or undesired/unsolicited e-mail traffic (Spam).

The policing tables may include a list of blocked IP addresses, MAC addresses, and/or other types of information associated with network users. Optionally, the filtering rules contained in the policing tables may be more complicated and take into account the type of traffic as well as the source, and optionally, destination, addresses. For example, a network operator may determine that a network user is generating an inordinate amount of Spam traffic, and may determine that the network user should not be allowed to send e-mail messages on the network. However, the network operator may still wish to provide network access to the network user to allow the network user to continue to access resources and receive e-mail over the mesh network. The policing tables, in this example, may include a rule indicating that e-mail traffic generated by a particular IP address or MAC address should not be forwarded by the inter-mesh communication point from the lower tier mesh network to the upper tier mesh network.

In addition to rules pertaining to individual users, the policing tables may be configured to include general policy rules, such as a rule that an emergency message such as a "911" message will always be forwarded regardless of whether the network user generating the emergency message does not have an account or is otherwise blocked from issuing traffic on the network. Other policy rules and filter rules may be implemented in the policing tables and the invention is not limited to any particular policing rules.

Several additional memory modules may also be connected to the expansion bus. For example, a flash memory chip may be attached to a slot on the expansion bus and configured to hold software and state information to be used by the IP switch processor in connection with boot operations of the inter-mesh communication point. For example, the flash memory chip may be configured to hold default instructions as well as state information associated with programs, communication sessions, and network users, that may have been using the resources provided by the inter-mesh communication point prior to the event which caused the need for the inter-mesh communication point to undertake a boot process. The flash memory may also contain initial instructions pertaining to operations the inter-mesh communication point should take in connection with any instantiated handshake protocols on the network. The invention is not limited to any particular type of information stored in the flash memory.

A Read Only Memory (ROM) 110 and a Random Access Memory (RAM) 112 may also be provided to store information, such as data and instructions, for execution on the IP switch processor. The RAM and ROM may be formed using any standard memory technology and the invention is not limited to any particular type of memory technology. The RAM and ROM may be used to store state information associated with flows through the network, software to be utilized by the IP switch processor in connection with processing protocol data units received over the mesh links, and any other convenient data or instructions. Other memory modules may be connected to the expansion bus 100, such as a log module or removable memory resource, and the invention is not limited to a network device implementing only the illustrated resources.

Optionally, the inter-mesh communication point may include an external communication port 114, such as an Ethernet (10baseT, 100baseT, 1000baseT, 10baseF, 100baseFX) or Universal Serial Bus (USB) port, to enable the inter-mesh communication point to be connected to fixed network resources or to a management terminal.

The inter-mesh communication point also includes a power provision and regulation section 116 configured to monitor power levels available to the inter-mesh communication point and control operation of the inter-mesh communication point as necessary. In the illustrated embodiment, the power provision and regulation section includes an interface to 120 volt AC power 118, an interface to 12 volt DC power 120, a battery 22, a power supply unit 124, a power monitor 126, and a switch 128. The invention is not limited to an embodiment having a power provision and regulation section configured as illustrated in FIG. 11.

Figure 11:
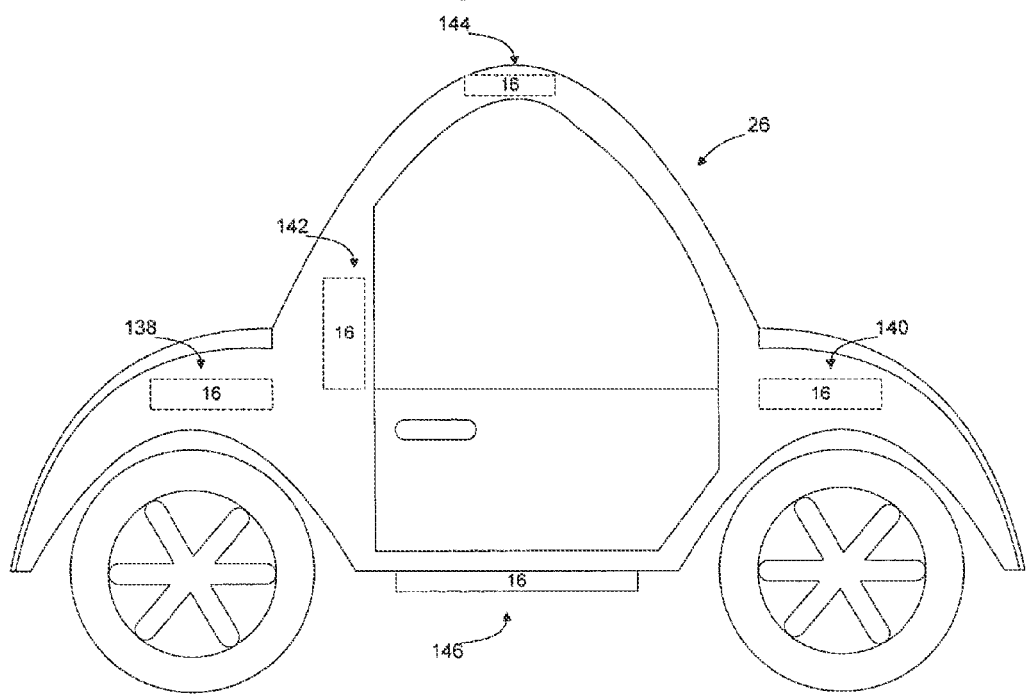
FIG. 11 is a functional block diagram of one embodiment of a vehicle that may house one or more wireless access point of FIGS. 7-10.

In the embodiment illustrated in FIG. 11, power is supplied to the inter-mesh communication point through the 120 Volt AC interface 118, the 12 Volt DC interfaced 120, and/or the battery 122. The battery may be internal to the network element or may be external and connected either via the 12VDC interface or via a separate battery terminal. The invention is not limited to an inter-mesh communication point including a battery or separate battery terminal. The power supply unit converts the received power into an operating voltage, such as 5 Volts DC, suitable for use by the other components of the inter-mesh communication point.

The power provision and regulation section also includes a power monitor configured to monitor the available power level from the battery and/or from the 12 Volt DC interface. As discussed above, the inter-mesh communication point, according to one embodiment of the invention, is configured to be deployed in an automobile or other vehicle. In this embodiment, the inter-mesh communication point may connect via the 12 Volt DC interface to the electrical system of the vehicle. As discussed below, when the vehicle motor is operational, the inter-mesh communication point should expect to be supplied with a relatively constant source of electrical power over the 12 Volt DC interface. However, after the motor has been shut off, power received through the 12 Volt DC interface will be drawn from the vehicle battery. To prevent the vehicle battery from being drained excessively, the power monitor may be configured to monitor the voltage at the interface, the current at the interface, or another quantity such as an integrated amount of power received over time. The invention is not limited to a particular method of monitoring the signals received over the external power interfaces.

A switch 128 is connected between the 12 Volt DC interface and the power supply unit, and optionally between the battery and the power supply unit. The switch is under the control of the power monitor and used to disconnect the power supply unit from the 12 volt interface in the event it appears that the vehicle battery may have reached a point where the inter-mesh communication point should cease drawing power out of it.

Optionally, the power provision and regulation section may interface with the IF switch processor to cause the inter-mesh communication point to have several operational states to enable it to reduce its power consumption as the amount of available power is reduced. In a first operational state, referred to herein as a full operational state, the power provision and regulation section determines that there is sufficient power available for the inter-mesh communication point to operate on both mesh networks and handle traffic for other network users in a fully operational manner.

In a second operational state, referred to herein as a limited operational state, the power provision and regulation section determines that there is insufficient power available for the inter-mesh communication point to operate as a relay point on the upper tier mesh network, but that there still is sufficient power for the inter-mesh communication point to participate in transmissions on the lower tier mesh network. In this state, the inter-mesh communication point may be configured to transmit on the higher tier mesh network only in the event of an emergency.

In a third operational state, referred to herein as a standby state, the power provision and regulation section determines that there is insufficient power available for the inter-mesh communication point to handle any traffic. Optionally, emergency traffic may still be handled when the inter-mesh communication point is in a standby state. Generally, however, the standby state enables the inter-mesh communication point to consume power to maintain its memory resources but otherwise prohibits operations from taking place on or through the inter-mesh communication point.

The power monitor may also identify available power resources and communicate a power resource indication on the network to enable power availability to be considered so that inter-mesh communication points with relatively larger power resources may be preferentially selected over inter-mesh communication points with relatively lower available power resources.

Figure 12:
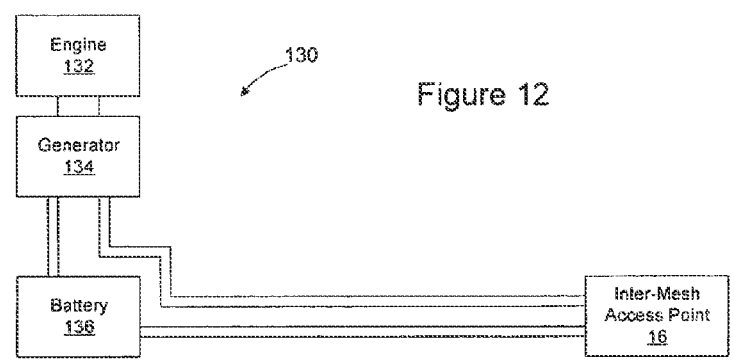
FIG. 12 is a functional block diagram of one embodiment of an electrical system of the vehicle of FIG. 11.

For example, assume that an inter-mesh communication point 16 is deployed in an vehicle 26, such as the automobile illustrated in FIG. 11, and connected to a power system 130 of the automobile 26, such as the power system illustrated in FIG. 12. When the vehicle's engine 132 is in use, and the vehicle is running, the engine conventionally will turn a generator 134 which generates electricity to charge the vehicle's battery 136 and to power other portions of the vehicle. Thus, inter-mesh communication point 16 may be provided with a relatively constant and unlimited supply of power when the vehicle is operational.

Once the vehicle stops running, however, the engine 132 will cease to operate, causing generator 134 to stop generating electricity. In this instance, if the inter-mesh communication point is to continue operations, it must rely on power stored in its own battery 122 or in the battery 136 provided with the vehicle 26. The power provision and regulation section 116, in one embodiment of the invention, is cognizant of whether the vehicle is operational and, when not operational, monitors the amount of power consumed from the vehicle battery to prevent an excess amount of power from being consumed from the vehicle battery. Were too much power to be consumed from the vehicle battery, it is possible there may not be enough power remaining in the vehicle battery to restart the vehicle's engine.

Control logic in the IF switch processor 98 may be implemented as a set of program instructions that are stored in a computer readable memory within the network element and executed on a microprocessor within the network element. However, it will be apparent to a skilled artisan that all logic described herein can be embodied using discrete components, integrated circuitry, programmable logic used in conjunction with a programmable logic device such as a Field Programmable Gate &tray (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

In the embodiments illustrated in FIGS. 7-10, when a packet or other protocol data unit is received at one of the mesh level one ports 76 or antenna 90, information provided along with the packet (such as in a packet header) is evaluated to determine which port is to receive the packet for transmission. Where two separate devices are used to implement the inter-mesh communication point (FIGS. 7 and 8), or where one device with two logical subcomponents is used to implement the inter-mesh communication point (FIG. 9), the determination may be made twice—once by the mesh level one access point 76 and once by the mesh level two relay point 74. Where one device used to implement the inter-mesh communication point is provided with integrated decision making capability (FIG. 10) it may be possible to make one determination as to which port should output the recently received packet. Once a determination is made, the packet is output to the proper port for transmission onto one of the mesh networks, or to a subsequent logical subcomponent of the inter-mesh communication point, depending on the particular implementation. The packet is then transported using the technology appropriate for that particular link. Optionally, additional processing may also be performed by the inter-mesh communication port 16, such as packet encapsulation or encryption operations, to enable the inter-mesh communication port to support VPN tunnels on one or more of the mesh networks.

According to one embodiment of the invention, one or more amplifiers are utilized, for example in the RF circuits 90, 92, to interface with the inter-mesh communication point antenna(s). The amplifiers may be linear (Class A-C) amplifiers or switching amplifiers (Class D-F), or any other type of amplifier. According to one embodiment of the invention, a Class E amplifier is utilized. Class E amplifiers are generally considered to have higher efficiency at the power levels expected to be used in the meshes. Other amplifiers may be utilized as well and the invention is not limited to the use of a Class E amplifier. Where desired, it may be advantageous to include multiple antennae for the several transmit paths, each of which is powered by an independent amplifier, although the invention is not limited to this embodiment.

FIG. 12 illustrates several examples of places in vehicle 26 where inter-mesh communication points 16 may be deployed. For example, an inter-mesh communication point may be deployed in the trunk 138, in the engine compartment 140, behind the back seat 142, in or on the roof 144, or under the car 146. The invention is not limited to these placements, but rather may be placed in any convenient location, where the form factor of the device allows it to be conveniently situated and where it may be attached to the vehicle's electrical system.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method, comprising:
    a first mobile device performing,
        detecting a power level of a power supply that provides power to the first mobile device;
        selectively enabling communication of the first mobile device through a first wireless mesh network and a second wireless mesh network dependent upon the detected power level, wherein the second wireless mesh network supports higher bandwidth communication than the first wireless mesh network;
        disabling communication of the first mobile device through the first wireless mesh network and the second wireless mesh network in response to the detection of a low power level; and
        enabling the first mobile device to relay emergency communication traffic through at least one of the first wireless mesh network and the second wireless mesh network in response to the detection of the low power level; and
        communicating a power resource indication of the first mobile device to a second mobile device dependent upon the detected power level, wherein the power resource indication includes information indicative of the power level of the power supply, and wherein the power resource indication is used by the second mobile device in a selection of a third mobile device to relay communication traffic.

2. The method of claim 1, further comprising disabling communication of the first mobile device through the second wireless mesh network in response to detecting an intermediate power level and determining that the detected intermediate power level is insufficient for the first mobile device to operate as a relay point on the second wireless mesh network.

3. A first mobile device comprising:
    one or more memories configured to store instructions; and
    one or more processors configured to receive instructions from the one or more memories and execute the instructions to cause the first mobile device to perform operations comprising:
        detecting a power level of a power supply that provides power to the first mobile device;
        selectively enabling communication of the first mobile device through a first wireless mesh network and a second wireless mesh network dependent upon the detected power level, wherein the second wireless mesh network supports higher bandwidth communication than the first wireless mesh network;
        disabling communication of the first mobile device through the first wireless mesh network and the second wireless mesh network in response to the detection of a low power level;
        enabling the first mobile device to relay emergency communication traffic through at least one of the first wireless mesh network and the second mesh network in response to the detection of the low power level; and
        communicating a power resource indication of the first mobile device to a second mobile device dependent upon the detected power level, wherein the power resource indication includes information indicative of the power level of the power supply, and wherein the power resource indication is used by a second mobile device in the selection of a third mobile device to relay communication traffic.

4. The first mobile device of claim 3, wherein the operations further comprise disabling communication of the first mobile device through the second wireless mesh network in response to detecting an intermediate power level and determining that the detected intermediate power level is insufficient for the first mobile device to operate as a relay point on the second wireless mesh network.

5. The first mobile device of claim 3, wherein the first mobile device is a cellular telephone.

6. The first mobile device of claim 3, wherein the first mobile device is incorporated into a passenger vehicle.

7. A computer-accessible non-transitory storage medium having program instructions executable by a processor of a first mobile device to:
   detect a power level of a power supply configured to provide power to the first mobile device;
   selectively enable communication of the first mobile device through a first wireless mesh network and a second wireless mesh network;
   disable communication of the first mobile device through the first wireless mesh network and the second wireless mesh network in response to the detection of a low power level, wherein the second wireless mesh network supports higher bandwidth communication than the first wireless mesh network;
   enable the first mobile device to relay emergency communication traffic through at least one of the first wireless mesh network and the second wireless mesh network in response to the detection of the low power level; and
   communicate a power resource indication of the first mobile device to a second mobile device dependent upon the detected power level, wherein the power resource indication includes information indicative of the power level of the power supply, and wherein the power resource indication is used by a second mobile device in the selection of a third mobile device to relay communication traffic.

8. The computer-accessible non-transitory storage medium of claim 7, wherein the program instructions are further executable by the processor to disable communication of the first mobile device through the second wireless mesh network in response to detecting of an intermediate power level and determining that the detected intermediate power level is insufficient for the first mobile device to operate as a relay point on the second wireless mesh network.

9. The computer-accessible non-transitory storage medium of claim 7, wherein the first mobile device comprises a cellular telephone.

10. The computer-accessible non-transitory storage medium of claim 7, wherein the first mobile device is incorporated into a passenger vehicle.

11. The method of claim 1, wherein at least one of the first wireless mesh network and the second wireless mesh network contain one or more non-wireless links.

12. The method of claim 1, further comprising the first mobile device performing communicating a second power resource indication of the first mobile device to the second mobile device dependent upon the detected power level, wherein the second power resource indication includes information indicative of the power level of the power supply, and wherein the second power resource indication is used by the second mobile device in the selection of the first mobile device to relay communication traffic.

13. The method of claim 1, further comprising the first mobile device performing:
   enabling of the first mobile device to serve as:
      a destination point in the first wireless mesh network for communication traffic originating from mobile devices in the first wireless mesh network prior to relaying said communication traffic onto the second wireless mesh network; and
      a wireless mesh relay point in the second wireless mesh network, wherein the wireless mesh relay point is configured to:
         send a first portion of the communication traffic onto the second wireless mesh network for transmission off of the second wireless mesh network via another relay point: and
         send a second portion of the communication traffic directly off the second wireless mesh network.

14. The system of claim 3, wherein at least one of the first wireless mesh network and the second wireless mesh network contain one or more non-wireless links.

15. The system of claim 3, wherein the operations further comprise communicating a second power resource indication of the first mobile device to the second mobile device dependent upon the detected power level, wherein the second power resource indication includes information indicative of the power level of the power supply, and wherein the second power resource indication is used by the second mobile device in the selection of the first mobile device to relay communication traffic.

16. The system of claim 3, wherein the operations further comprise enabling of the first mobile device to serve as:
   a destination point in the first wireless mesh network for communication traffic originating from mobile devices in the first wireless mesh network prior to relaying said communication traffic onto the second wireless mesh network; and
   a wireless mesh relay point in the second wireless mesh network, wherein the wireless mesh relay point configured to:
      send a first portion of the communication traffic onto the second wireless mesh network for transmission off of the second wireless mesh network via another relay point; and
      send a second portion of the communication traffic directly off the second wireless mesh network.

17. The computer-accessible non-transitory storage medium of claim 7, wherein at least one of the first wireless mesh network and the second wireless mesh network contain one or more non-wireless links.

18. The computer-accessible non-transitory storage medium of claim 7, wherein the program instructions are further executable by the processor to communicate a second power resource indication of the first mobile device to the second mobile device dependent upon the detected power level, wherein the second power resource indication includes information indicative of the power level of the power supply, and wherein the second power resource indication is used by the second mobile device in the selection of the first mobile device to relay communication traffic.

19. The computer-accessible non-transitory storage medium of claim 7, wherein the program instructions are further executable by the processor to:
   enable the first mobile device to serve as:
      a destination point in the first wireless mesh network for communication traffic originating from mobile devices in the first wireless mesh network prior to relaying said communication traffic onto the second wireless mesh network; and
      a wireless mesh relay point in the second wireless mesh network, wherein the wireless mesh relay point configured to:

send a first portion of the communication traffic onto the second wireless mesh network for transmission off of the second wireless mesh network via another relay point; and send a second portion of the communication traffic directly off the second wireless mesh network.

\* \* \* \* \*

UNITED STATES PATENT AND TRADEMARK OFFICE
CERTIFICATE OF CORRECTION

PATENT NO. : 9,203,641 B2  
APPLICATION NO. : 13/567373  
DATED : December 1, 2015  
INVENTOR(S) : Martin Ridgway Handforth et al.

Page 1 of 1

It is certified that error appears in the above-identified patent and that said Letters Patent is hereby corrected as shown below:

Title Page

Item (74) Attorney, Agent, or Firm: Please delete "Myertons" and substitute -- Meyertons --

Signed and Sealed this
Sixteenth Day of August, 2016

Michelle K. Lee
*Director of the United States Patent and Trademark Office*